United States Patent [19]

Cornelison et al.

[11] Patent Number: 4,672,809
[45] Date of Patent: Jun. 16, 1987

[54] CATALYTIC CONVERTER FOR A DIESEL ENGINE

[76] Inventors: Richard C. Cornelison, 6587 Rte. 82, Hiram, Ohio 44234; William B. Retallick, 1432 Johnny's Way, West Chester, Pa. 19382

[21] Appl. No.: 859,438

[22] Filed: May 5, 1986

Related U.S. Application Data

[63] Continuation-in-part of Ser. No. 648,381, Sep. 7, 1984, Pat. No. 4,597,262.

[51] Int. Cl.⁴ .......................... F01N 3/02; F01N 3/28
[52] U.S. Cl. .............................. 60/286; 55/DIG. 30; 60/299; 60/311; 422/180; 502/527
[58] Field of Search ......................... 60/286, 299, 311; 422/180, 171, 176, 222; 502/527; 55/DIG. 30

[56] References Cited

U.S. PATENT DOCUMENTS

4,058,485 11/1977 Cheung .............................. 502/527
4,157,929 6/1979 Kubicek ............................ 502/527
4,268,482 5/1981 Arashi ............................... 422/180
4,530,418 6/1985 Cume ............................. 55/DIG. 30
4,576,800 3/1986 Retallick ........................... 502/527

Primary Examiner—Douglas Hart
Attorney, Agent, or Firm—William H. Eilberg

[57] ABSTRACT

A catalytic converter for a diesel engine comprises a labyrinth made of metal foil. The foil is coated with an oxidation catalyst. When exhaust gas flows through the labyrinth, the gas is forced to make right-angle turns at intervals as short as about 5 mm. The number of right-angle turns can be as great as 30 turns per cubic centimeter of labyrinth. These abrupt turns cause particulates in the gas to be deposited on the foil. At intervals, fuel is injected into the exhaust gas. The fuel burns on the catalyzed surface and heats the converter sufficiently to burn the trapped particulates. In an alternative embodiment, there are two converters, and fuel is automatically injected into that converter which has more trapped particulates than the other, so as to burn the particulates trapped in that converter.

32 Claims, 6 Drawing Figures

CATALYTIC CONVERTER FOR A DIESEL ENGINE

CROSS-REFERENCE TO PRIOR APPLICATION

This is a continuation-in-part of U.S. patent application Ser. No. 648,381, filed Sept. 7, 1984 now U.S. Pat. No. 4,597,262.

BACKGROUND OF THE INVENTION

This invention discloses a catalytic converter for a diesel engine. More specifically, it discloses a catalytic converter that traps out the particulates in the exhaust gas and retains the particulates so that they can be burned off intermittently. Then the catalytic converter is again loaded with trapped particulates that are burned off at the end of the next cycle.

Catalytic converters are now standard equipment on gasoline powered automobiles, and their practicality for gasoline engines is well demonstrated. Catalytic converters for diesel engines pose different problems from those encountered with gasoline engines. Diesel exhaust is cooler than the exhaust from a gasoline engine, especially when the diesel engine is idling or running at low power output. Sometimes the diesel exhaust is so cool that a catalytic converter cannot light off and burn the easily-combustible carbon monoxide and hydrocarbons in the exhaust. Even when the diesel engine is running at high power output, the exhaust is seldom hot enough to burn the particulates therein. The particulates would pass through the converter and add to the suspended solids in the atmosphere. It is especially important to remove these diesel particulates because they are suspected of being carcinogenic.

The problem of diesel particulates and previous attempts to remove them have been described in three reports sponsored by the U.S. Environmental Protection Agency. These are EPA-600/7-79-232b, EPA-625/9-79-004, and "Ignition Properties and Catalytic Oxidation of Diesel Particulate," of the Battelle Columbus Laboratories, 1982. These reports describe particulate traps that comprised quartz wool, stainless steel wool, and ceramic honeycombs similar to those used for catalyst supports in automobile converters. The quartz wool was not nearly rugged enough. The stainless steel collapsed when it was heated by the burning particulates. The honeycomb tested at Battelle was a bundle of square channels having thin porous walls through which the exhaust gas was made to pass. The face of the honeycomb was a square grid, like a checkerboard, but with very small squares, say, 200 squares per square inch. If all of the red squares in the supposed checkerboard are plugged on the inlet face of the honeycomb, and all of the black squares are plugged on the outlet face, then the gas must pass through one ceramic wall during its passage through the honeycomb. This arrangement did trap out the particulates, within or upon the porous walls of the honeycomb. But the pressure drop rose rapidly and reached six inches of mercury after only fifteen minutes. Such a pressure drop is much too high to be practical. The collected particulates were catalyzed for burning by spraying them with a solution of a copper salt.

The term "pressure drop" as used herein means the difference between the pressure at the input end and the pressure at the output end of the converter. A high pressure drop is undesirable, because it reduces the efficiency of the engine. With a high pressure drop, as would be caused by an excessive amount of particulates in the converter, the engine must expend extra energy to force the exhaust gas through the converter, in addition to supplying energy for locomotion.

In the present invention, the particulates are not collected in a single compact layer through which the exhaust must pass, but instead the particulates are distributed throughout the entire converter so that the pressure drop builds up slowly.

SUMMARY OF THE INVENTION

The invention comprises at least one strip of metal, preferably having the thickness of a foil. The strip is formed into an undulating series of U-bends. Some of the U-bends are open on top, and the others are closed on top. The open and closed U-bends alternate in a checkerboard pattern. The strip is aligned generally transversely to the direction of flow of exhaust gas from the engine. The strip defines a tortuous flow path for exhaust gas from the engine. The strip is coated with an oxidation catalyst.

A stack of strips, of the type described, can be formed, the stack comprising a labyrinth. Each layer of the labyrinth comprises one such strip. Adjacent strips are preferably rotated relative to each other, such as by an angle of 90°. When exhaust gas flows through this labyrinth, the gas is forced to make a right-angle turn at intervals as short as about 5 mm. Furthermore, the number of right-angle turns imposed on the gas can be as great as about 30 turns per cubic centimeter of labyrinth volume. These abrupt turns cause particulates in the gas to be deposited on the foil, so that they are trapped in the converter, and so that they can be burned off later on.

The concept of depositing particulates by forcing the gas through abrupt right-angle turns is disclosed and claimed in the copending U.S. patent application Ser. No. 648,381, filed Sept. 7, 1984. The structure of the labyrinth disclosed herein generates many more abrupt turns per volume of converter, as compared with the converter shown in the cited application.

In one embodiment, the apparatus automatically determines when the converter is filled with particles. When the apparatus measures the pressure drop to be above a preset level, indicating that the converter is so filled, fuel is injected into the exhaust gas to raise the temperature in the converter sufficiently to burn the particulates. The temperature of the gas is monitored, and the flow of fuel is regulated automatically to maintain a temperature which is sufficient for burning the particulates, but which is not high enough to destroy the catalyst.

In still another embodiment, there are two catalytic converters, of identical construction, and disposed in parallel. When the apparatus senses a pressure drop exceeding a preset level, the apparatus determines automatically which converter is more clogged with particulates, and directs fuel into that converter, burning off the particulates therein until the converter is sufficiently cleared.

It is therefore an object of the invention to provide a catalytic converter for a diesel engine, which converter traps out the particulates and retains them so that they can be burned off intermittently.

It is another object to provide a catalytic converter as described above, wherein the converter causes the exhaust gas of the engine to make many right-angle turns.

It is another object to provide a catalytic converter wherein the accumulated particulates are distributed throughout the converter so that the pressure drop does not build up rapidly.

It is another project to provide a trap for diesel particulates that has a simple design and is economical to construct.

It is a further object to provide a catalytic converter for a diesel engine, wherein the burn-off of particulates trapped within the converter is accomplished automatically.

It is a further object to provide a catalytic converter for a diesel engine having two substantially identical sections, and wherein the particulates in only one converter section at a time are burned off.

It is a further object to provide a catalytic converter in two sections, as described above, wherein the sensing and control functions are performed automatically.

Other objects and advantages of the present invention will be apparent to those skilled in the art, from a reading of the following brief description of the drawings, the detailed description of the invention, and the appended claims.

DETAILED DESCRIPTION OF THE INVENTION

The catalytic converter of the present invention forces the exhaust gas to make at least one, and preferably many, right-angle bends, as it leaves the engine. The converter comprises at least one metal strip, preferably of foil thickness. The strip is formed into an undulating series of U-bends, some of which are open on top, and some of which are closed on top. The open and closed U-bends alternate in a checkerboard pattern. The strip is aligned generally transversely to the direction of flow of exhaust gas from the engine. The strip is coated with an oxidation catalyst.

Figure 1A:
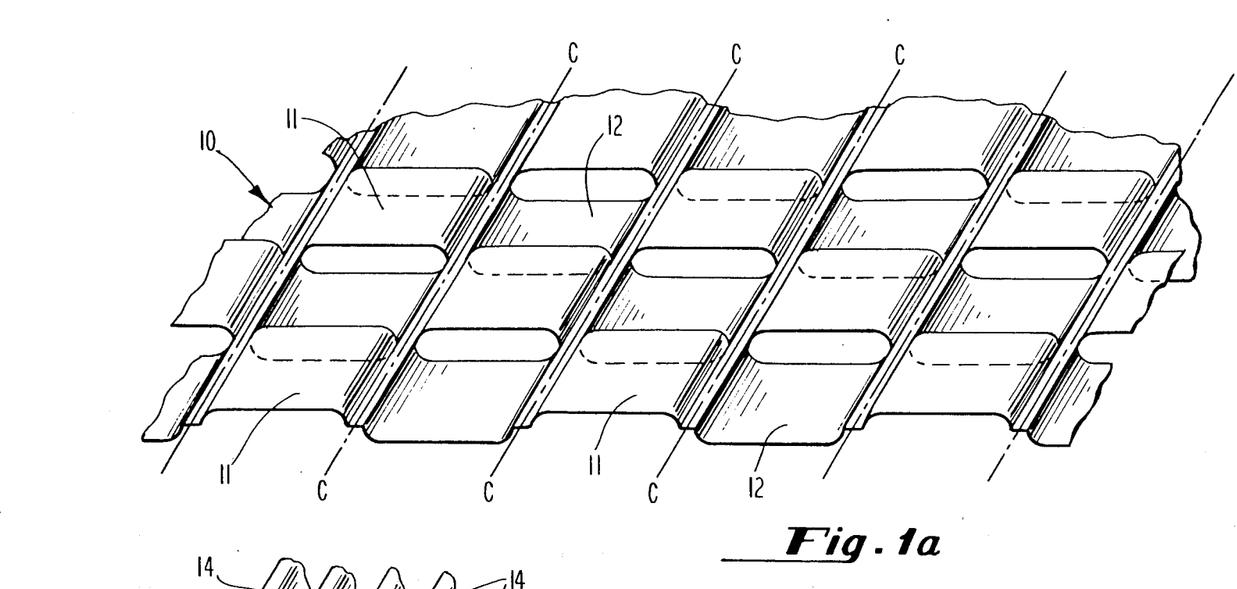
FIG. 1a is a perspective view of a fragment of a strip of metal foil, indented and ready for folding.

FIG. 1a shows a segment of metal 10 ready to be folded back and forth upon itself to make the strip for the converter. The surface of the metal, which is preferably a foil, is formed into a repeating pattern of open ended indentations 11. Indentations 11 project above the original flat surface of the foil, and indentations 12 project below the surface. The "up" indentations 11 and the "down" indentations 12 alternate both along the length of segment 10 and across its width.

Indentations 11 and 12 are aligned in rows across the width of the segment. There remains a narrow band of flat, unindented metal between these rows, generally indicated by the lines C—C. When the metal is folded back and forth upon itself along these narrow bands, the result is the structure shown in FIG. 1b. Each row of indentations along the length of the metal has been formed into an undulating series of U-bends. The U-bends 13 are open on top, and the U-bends 14 are closed on top. U-bends 13 and 14 alternate in both of the directions indicated by arrows 15 and 16. That is, the open and closed U-bends form a checkerboard pattern.

Figure 1B:
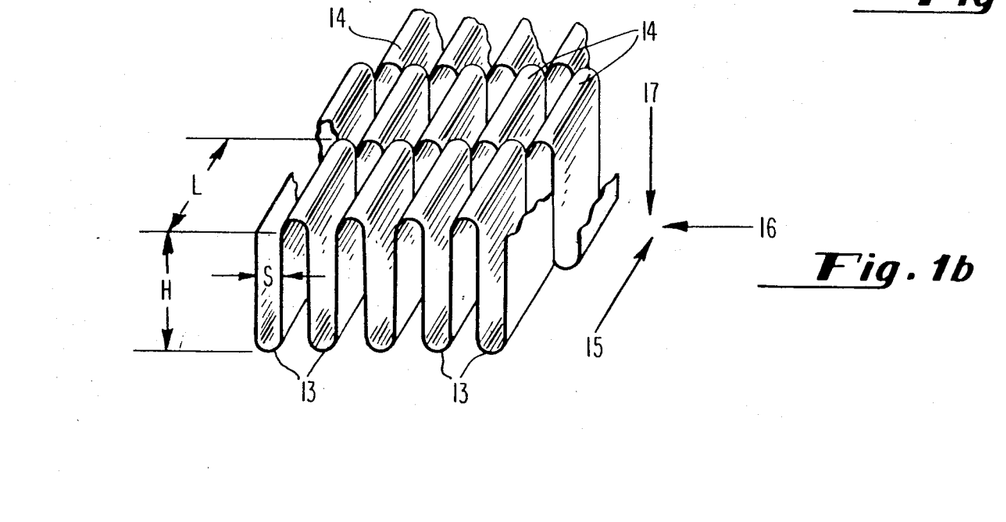
FIG. 1b is a perspective view of the structure formed by folding the strip in FIG. 1a back and forth upon itself.

Now consider what happens when gas flows through the structure in FIG. 1b. If the gas flows in the direction of arrow 15, it will flow through essentially straight channels, and the desired right-angle turns will not occur. If the gas tries to flow in the direction of arrow 16, it will find no clear channel, and the pressure drop will be high. Arrow 17 indicates the preferred direction of flow, i.e. generally normal to the plane of the strip. The downflowing gas will enter into the U-bends 13 that are open on top. Then the gas will make a right-angle turn into the U-bends 14 that are closed on top. There the gas will make another right-angle turn and resume its downward flow. The first right-angle turn which is made against the bottom of U-bend 13 will be more effective for removing particulates. Then the number of effective right-angle turns per unit volume of labyrinth will be equal to the number of open top U-bends per unit volume.

FIG. 1b shows the dimensions of a particular structure of a folded strip that has been built. The height H was 5 mm; the length L was 3 mm; the spacing S was 1 mm. These dimensions generate 30 open top U-bends per cubic centimeter of labyrinth built up from the strip. It is preferred to rotate successive layers relative to each other, and preferably by 90°, so that the open bottom of a U-bend can never be completely blocked by a closed top in the underlying layer.

The gas makes many right-angle turns during its passage through the converter, and each turn removes a fraction of the particulates. In this way, the particulates are distributed throughout the entire converter so that the pressure drop does not build up rapidly. This is an important advantage of the present invention, and is an advantage which is not obtained with a ceramic honeycomb particle trap. In the honeycomb trap, the particulates accumulate in a compact thin layer, and the gas must flow through this layer as the layer grows thicker and the pressure drop increases. In the converter of the present invention, the gas flows over, past, or around the particulates that have been trapped out. The pressure drop in the present invention does increase as particulates accumulate, but not as rapidly or as much as when the gas must flow through the accumulated particulates.

Figure 2:
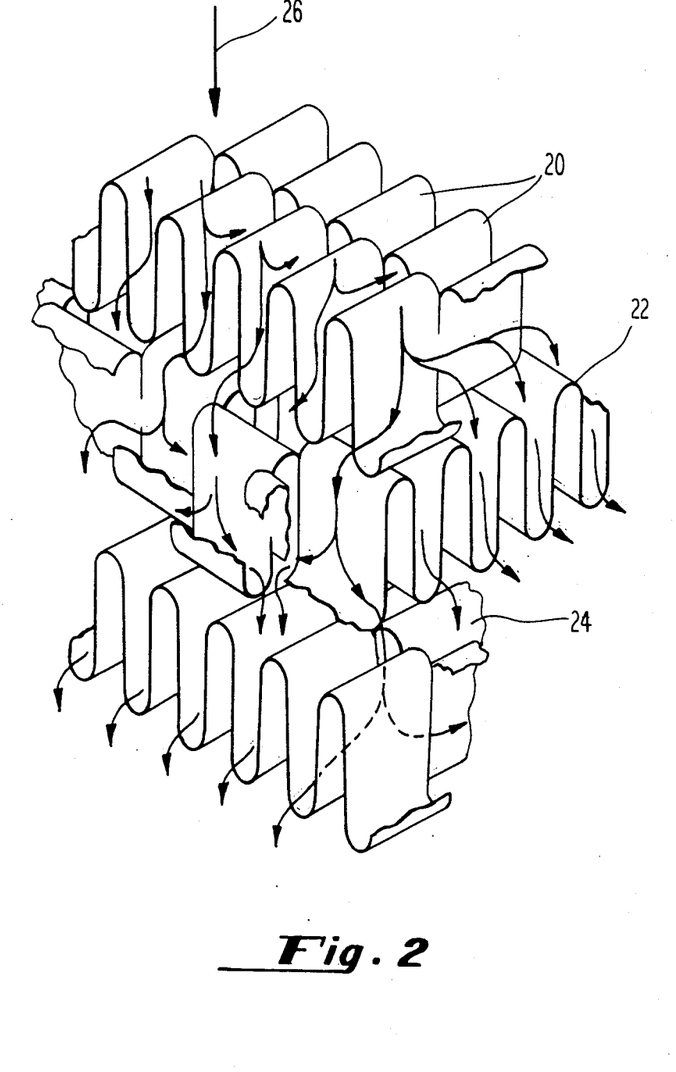
FIG. 2 is a fragmentary perspective view of a stack of strips, of the type shown in FIGS. 1a and 1b, the strips together defining a labyrinth.

FIG. 2 is a fragmentary perspective view of a plurality of folded strips which have been stacked to form the labyrinth, discussed above. FIG. 2 shows folded strips 20, 22, and 24. Alternate strips are rotated by 90°, relative to each other, as shown, although it is possible to rotate adjacent strips by different relative angles. Exhaust gas is directed at the labyrinth in the general direction indicated by arrow 26. Gas traveling along this direction enters those U-bends of strip 20 which are open on top, and the gas is forced to make a right-angle turn. The gas can then enter the U-bends of the next strip, i.e. strip 22, and so on. The various arrows in FIG.

2 show some of the many paths which can be taken by the gas.

The exhaust gas is directed towards the entire general area of the converter, and not into only one U-bend at a given moment. The pressure of one part of the stream tends to force another part of the stream to undergo another right-angle turn. Thus, the presence of exhaust gas flowing through many U-bends tends to insure that gas flowing into a particular U-bend will be forced to make many right-angle turns.

Gas flowing through the labyrinth is forced to make many right-angle turns as it leaves the engine. In the embodiment having the dimensions mentioned above, gas flowing through the labyrinth is forced to make a right-angle turn at intervals as short as about 5 mm. Furthermore, the number of right-angle turns imposed on the gas can be as great as about 30 turns per cubic centimeter of labyrinth volume.

When the converter is loaded with particulates that are to be burned off, a fuel is injected into the gas flowing through the converter. The fuel can be diesel fuel or any other fuel that can be vaporized. The fuel burns on the catalyzed surface and raises the temperature sufficiently to burn off the particulates. For complete burning of the particulates, this temperature must be as high as about 550° C. Such a temperature is seldom reached in the exhaust gas leaving a diesel engine. This is why the additional fuel must be injected.

There is insufficient contact between the trapped particulates and the catalyzed surface for the surface to catalyze the burning of the particulates. But there is excellent contact between the vaporized fuel and the catalyzed surface. Thus, the vaporized fuel burns readily and heats the converter, and the accumulated particles are in turn oxidized.

In the intervening periods between burn offs, the catalyzed surface serves to burn the hydrocarbons and the carbon monoxide in the exhaust, in the conventional way a converter is used in an emissions stream.

Figure 3:
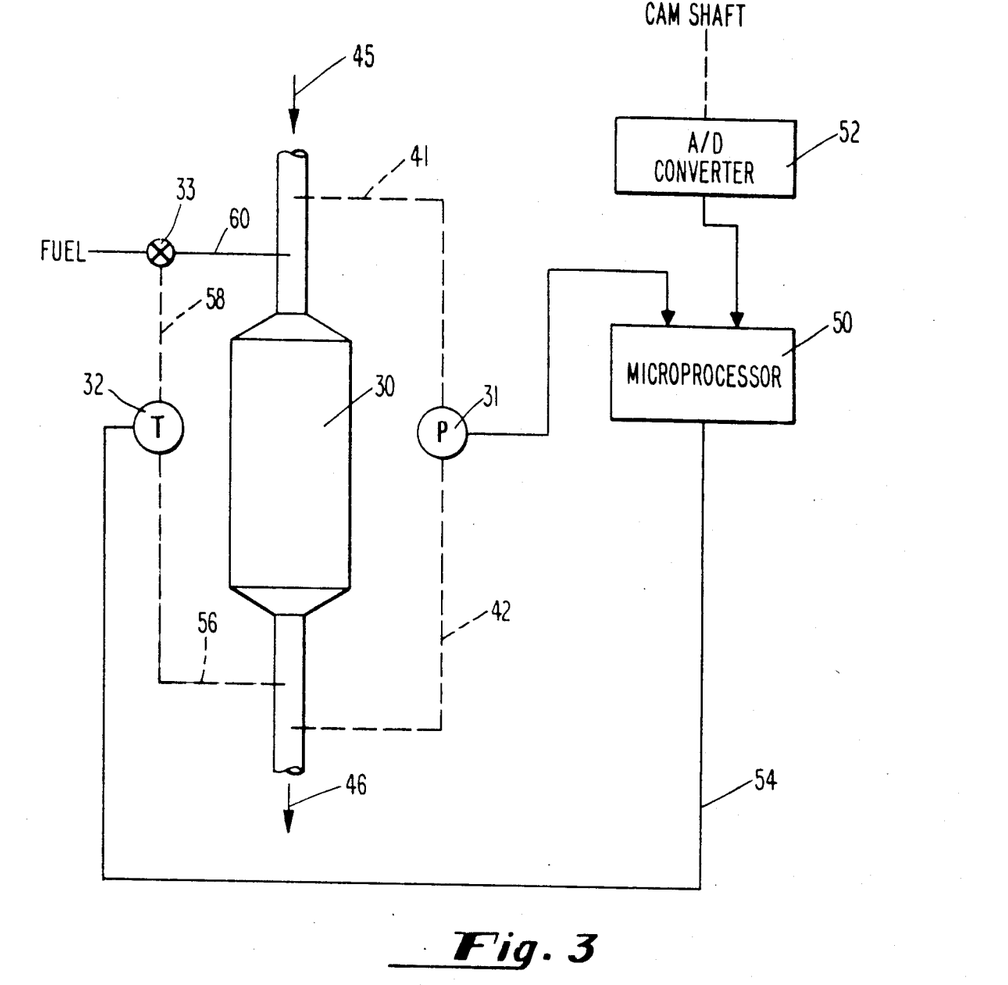
FIG. 3 is a schematic diagram illustrating an embodiment of the invention comprising automatic means for sensing a clogged condition of the catalytic converter, and for burning off the particulates therein.

FIG. 3 is a schematic diagram of an embodiment of the invention that automatically controls the state of the converter. The embodiment comprises a single catalytic converter 30 which is of the same construction as shown in FIGS. 1 and 2. That is, converter 30 comprises a stack of strips of the type shown in FIGS. 1 and 2. Exhaust gas flows through the apparatus in the direction indicated by arrows 45 and 46.

The pressure drop across converter 30 is measured by pressure monitor 31. Pressure monitor 31 includes sensing means, indicated schematically by dotted lines 41 and 42, to measure the pressures at the input and output ends of converter 30. An excessively high difference in pressure, i.e. the pressure drop, indicates that the converter is clogged with particulates, and needs an injection of fuel to support their burn off.

The value of the pressure drop across the catalytic converter depends on the velocity of flow of exhaust gas, which depends in turn on the speed of the engine. If the engine were operating at constant speed, the measurement of the difference between input and output pressures could be compared directly with a preset standard, and could be used to trigger the injection of fuel into the converter. But since the engine cannot be assumed to be running at constant speed, the direct readings from pressure monitor 31 are not meaningful.

The present invention therefore includes a means for interpreting the meaning of the reading from pressure monitor 31. The means shown in FIG. 3 is microprocessor 50 which receives, as its inputs, the value of the pressure drop, from monitor 31, and the speed of the engine, which is supplied by an analog to digital converter 52 which is connected to the cam shaft of the engine. Stored in microprocessor 50 is a graph or table showing the maximum acceptable pressure drop for each engine speed.

When the pressure drop, as measured by pressure monitor 31, is found by microprocessor 50 to be greater than the maximum acceptable pressure drop for the current engine speed, microprocessor 50 emits a signal through its output line 54 to activate temperature controller 32. Temperature controller 32 is essentially a thermostat, and is connected, as represented schematically by dotted line 56, to measure the temperature of the exhaust gas leaving catalytic converter 30. Controller 32 is also connected, as shown by dotted line 58, to valve 33. Valve 33 controls the flow of fuel, through fuel line 60, into catalytic converter 30.

After being enabled by a signal from microprocessor 50, temperature controller 32 maintains the temperature in the catalytic converter 30 at the desired level, about 600° C., by increasing or decreasing the flow of fuel. Meanwhile, pressure monitor 31 continues to sense the pressure drop across converter 30. When the pressure drop falls below a level appropriate to the current engine speed, the microprocessor 50 emits a signal which turns off temperature controller 32, which causes the flow of fuel through line 60 to be shut off.

The process by which the catalytic converter is cleansed of its accumulated particulates by the burn off described above is known as regeneration. Regeneration will occur again when the pressure drop rises above an acceptable level (for a given engine speed). When the pressure drop falls below a predetermined level, for a given engine speed, regeneration is considered to be complete.

Figure 5:
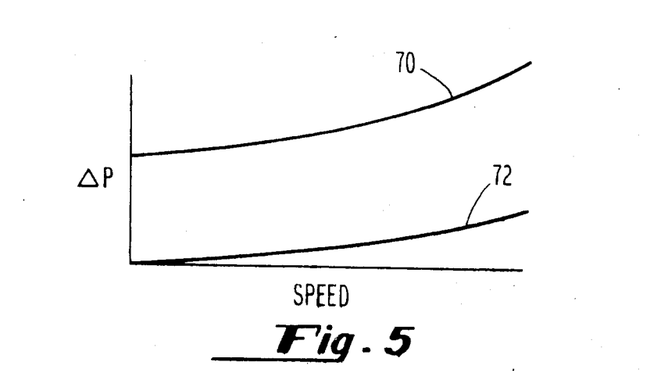
FIG. 5 is a diagram indicating the approximate relationship between engine speed and pressure drop through the converter.

FIG. 5 shows, in qualitative form, the information that is stored in microprocessor 50. The ordinate is the pressure drop, and the abscissa is the engine speed. Curve 70 represents the maximum acceptable pressure drop for each possible engine speed. When the pressure drop, at any engine speed, rises above this line, the catalytic converter needs regeneration. While the converter is being regenerated, microprocessor 50 continuously checks to see if the pressure drop has fallen below the value indicated by curve 72. When this condition occurs, the regeneration is complete, and the flow of fuel into the converter can be shut off.

It should be noted that the decisions to initiate and terminate regeneration of the catalytic converter, made by microprocessor 50, are made, in general, at different engine speeds. It is the stored information in the microprocessor, as represented by the graph in FIG. 5, that permits such decisions to be made, regardless of the engine speed at a particular moment. The graph of FIG. 5 may be represented in the microprocessor as a discrete table instead of a pair of continuous curves.

During the regeneration of a single converter, as shown in FIG. 3, all of the exhaust gas must be heated to about 600° C. Less fuel would be needed if only part of the exhaust gas had to be heated to the burn off temperature. This is accomplished by the embodiment shown in FIG. 4, wherein there are two catalytic converters.

Figure 4:
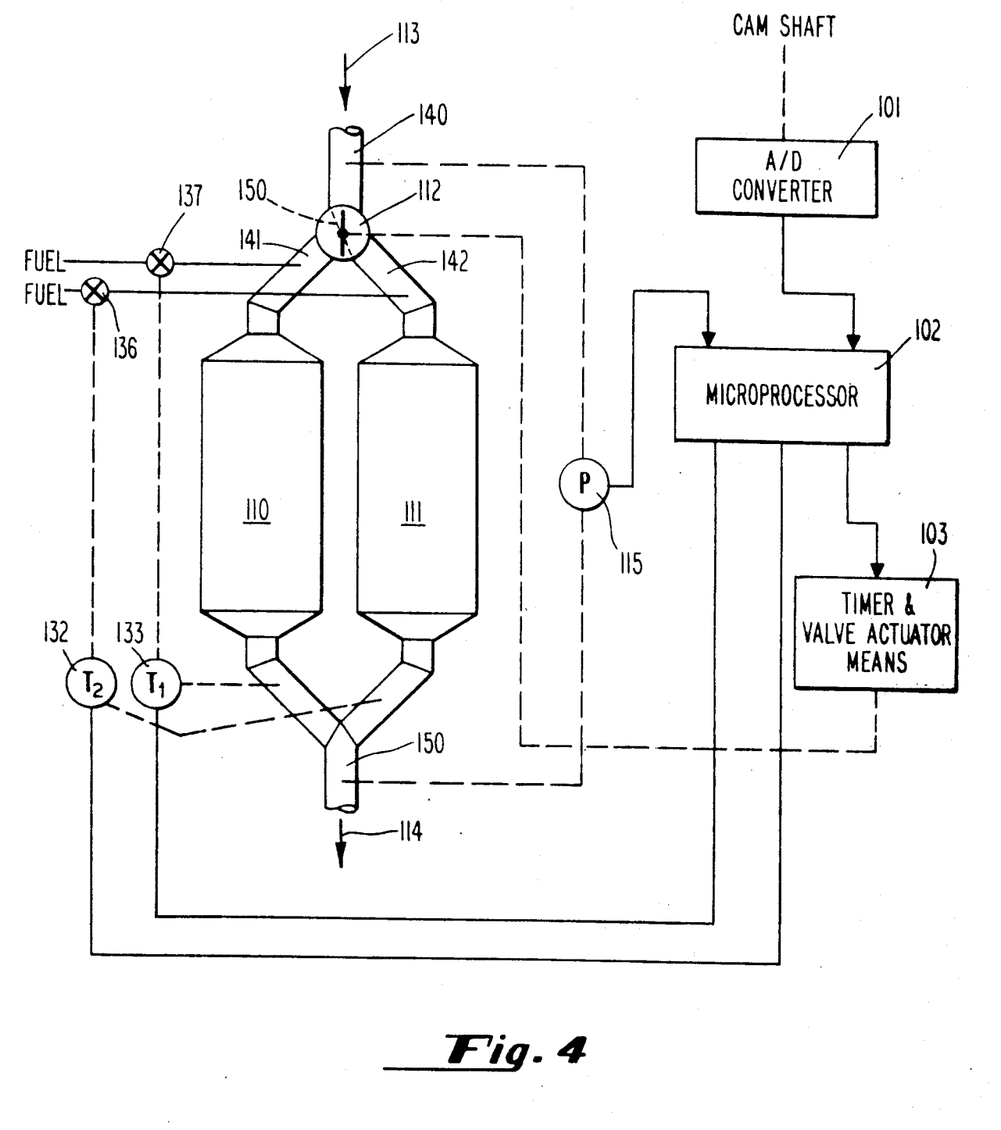
FIG. 4 is a schematic diagram illustrating another embodiment, wherein there are two converters, and wherein the particulates in only one converter are burned off at one time.

In the embodiment of FIG. 4, only one converter at a time is regenerated. Catalytic converters 110 and 111 are of substantially the same construction as that shown in FIG. 3, the direction of exhaust gas flow being indicated by arrows 113 and 114. Exhaust duct 140 is connected to butterfly valve 112, which is connected to conduits 141 and 142 which direct gas into catalytic converters 110 and 111, respectively. Butterfly valve 112 has three positions: a neutral position as shown, allowing gas to flow freely into both converters, and two positions which force most of the gas to flow to only one of the converters. Dotted line 150 represents one of the latter positions, which closes off most of the flow to converter 110. The remaining valve position, not shown, closes off most of the flow to converter 111. Butterfly valve 112 thus comprises a diverter means, which diverts the flow of gas to one or the other of the catalytic converters.

It is important that the flow of exhaust gas to either converter not be closed off entirely. Diesel engine exhaust contains relatively large amounts of oxygen, which is needed to support the combustion during the regeneration process.

As in the case of the single converter embodiment, a pressure monitor 115 is connected to the input and output ends of the apparatus. Note that the pressure drop must be measured at exhaust duct 140 and output duct 150. That is, the pressure drop is measured for the system as a whole.

As before, a microprocessor 102 receives inputs representing the pressure drop, as well as engine speed (from analog to digital converter 101). Microprocessor 102 stores a graph or table of the type suggested in FIG. 5.

Microprocessor 102 is connected to temperature controllers 132 and 133, which operate fuel valves 136 and 137, respectively, in a manner entirely similar to that described with respect to the single converter embodiment. However, microprocessor 102 is also connected to a timer and valve actuator means 103, which operates butterfly valve 112.

When the microprocessor 102 senses an unacceptably high pressure drop, it causes means 103 to turn bufferfly valve 112 to one of its two non-neutral positions, and then to the other such position. For example, means 103 will first actuate valve 112 such that flow of gas through converter 110 is substantially cut off. Valve 112 is held in this position for a few seconds by means 103, while the microprocessor internally records and stores the observed pressure drop. This observed pressure drop gives an indication of the extent to which converter 111 is filled with particulates. Then, means 103 causes valve 112 to cut off most of the exhaust gas flow to converter 111, and to enable gas to flow through converter 110. The microprocessor then records and stores the pressure drop reading. The microprocessor 102 then selects the catalytic converter, either 110 or 111, that is in greater need of regeneration. Of course, at all times, microprocessor 102 automatically takes into consideration the engine speed at the time of measurement. For example, the microprocessor 102 would record, for both catalytic converters, the difference between the measured pressure drop and the curve 70 of FIG. 5. The converter whose reading is farther above curve 70 is the converter selected for regeneration.

When the microprocessor 102 selects a converter for regeneration, it emits an enabling signal to one of the temperature controllers 132 or 133 so as to cause fuel to be injected, in a controlled manner, into the converter selected for regeneration. This regeneration process is entirely similar to that discussed with reference to FIG. 3.

While one of the converters 110 or 111 is being regenerated, microprocessor 102 keeps a record of the elapsed time. After five minutes of regeneration, microprocessor momentarily disables the temperature controller, and, through means 103, turns butterfly valve 112 momentarily to the neutral position. The pressure drop across the entire apparatus is then measured. If the pressure drop is sufficiently low for the current engine speed, the regeneration is complete, and the system returns to its initial state, i.e. with butterfly valve 112 in the neutral position and both temperature controllers disabled. If the pressure drop is not low enough, microprocessor 102 re-activates the temperature controller that was previously operative, and regeneration continues. Thereafter, every minute, the microprocessor 102 interrupts the regeneration process to determine whether the regeneration may be terminated.

The test for completeness of the regeneration process requires only about one or two seconds. The entire regeneration process may take five to ten minutes, or more. It is expected that, for most of the period during which the engine is running, no regeneration is taking place, and valve 112 would therefore be in the neutral position most of the time.

It is clear that the objects of the invention are fulfilled by the above disclosure. It is understood that many modifications of the invention are possible. The embodiments of FIGS. 3 and 4 show a microprocessor to perform the controlling functions, but the same tasks could be accomplished by mechanical or electromechanical means. The particular control mechanisms for the pressure monitor and the temperature controllers can be varied, and different designs substituted. The number of layers in the converters, and the number of converters, can be varied. The two converters in the embodiment of FIG. 4 can be constructed as two distinct sections of a single converter. It is understood that these and other modifications should be considered within the spirit and scope of the following claims.

What is claimed is:

1. A catalytic converter for a diesel engine comprising at least one metal strip, the strip being formed into an undulating series of U-bends, the series comprising U-bends that are open on top and U-bends that are closed on top, the open and closed U-bends alternating in a checkerboard pattern, the strip being aligned generally transversely to the direction of flow of exhaust gas from the engine, the strip defining a tortuous flow path for exhaust gas from the engine, the strip being coated with a combustion catalyst.

2. The converter of claim 1, wherein the U-bends are of substantially uniform size.

3. The converter of claim 1, wherein there are a plurality of strips, stacked one above the next, wherein adjacent strips are rotated relative to each other.

4. The converter of claim 3, wherein adjacent strips are rotated by substantially 90° relative to each other.

5. A catalytic converter for a diesel engine, comprising a labyrinth made of a plurality of strips of metal, each strip being formed into an undulating series of U-bends, the series comprising U-bends that are open on top and U-bends that are closed on top, the open and closed U-bends alternating in a checkerboard pattern, the strip being aligned generally transversely to the direction of flow of exhaust gas from the engine, the strips defining a tortuous flow path for exhaust gas from the engine, the strips being coated with a combustion catalyst.

6. The converter of claim 5, wherein the U-bends are of substantially uniform size.

7. The converter of claim 5, wherein adjacent strips of the labyrinth are rotated relative to each other.

8. The converter of claim 7, wherein adjacent strips of the labyrinth are rotated by 90° relative to each other.

9. An automatic, self-regenerating catalytic converter system for a diesel engine, comprising:
 (a) a catalytic converter connected to receive exhaust gas from the diesel engine, the catalytic converter comprising at least one metal strip, the strip being formed into an undulating series of U-bends, the series comprising U-bends that are open on top and U-bends that are closed on top, the open and closed U-bends alternating in a checkerboard pattern, the strip being aligned generally transversely to the direction of flow of exhaust gas from the engine, the strip defining a tortuous flow path for exhaust gas from the engine, the strip being coated with a combustion catalyst,
 (b) pressure monitoring means for continuously sensing the pressure drop between the input and output ends of the catalytic converter,
 (c) temperature regulating means for maintaining the temperature in the catalytic converter at a desired level, and
 (d) control means for actuating the temperature regulating means, the control means being connected to receive inputs from the pressure monitoring means and at least one moving part of the engine, the control means being adapted to actuate the temperature regulating means when the pressure drop, for a given engine speed, exceeds a predetermined level, and to deactivate the temperature regulating means when the pressure drop, for a given engine speed, falls below another predetermined level.

10. The catalytic converter system of claim 9, wherein the temperature regulating means comprises means for sensing the temperature of the exhaust gas leaving the catalytic converter, and valve means operatively connected to the sensing means, wherein the valve means controls the flow of fuel into the catalytic converter.

11. The catalytic converter system of claim 10, wherein the control means is operatively connected to the cam shaft of the engine, whereby the control means receives inputs from the pressure monitoring means and the engine cam shaft.

12. The catalytic converter system of claim 11, wherein the control means comprises a microprocessor, the microprocessor containing stored charts representing the maximum acceptable pressure drop for a given engine speed, and the pressure drop, for a given engine speed, below which the temperature regulating means should be deactivated.

13. The catalytic converter system of claim 12, wherein the cam shaft of the engine is connected to an analog-to-digital converter, and wherein the output of the analog-to-digital converter is connected to the input of the microprocessor.

14. An automatic, self-regenerating catalytic converter system for a diesel engine, comprising:
 (a) a pair of catalytic converters, the catalytic converters being connected in parallel to receive exhaust gas from the diesel engine, the catalytic converters both comprising at least one metal strip, the strip being formed into an undulating series of U-bends, the series comprising U-bends that are open on top and U-bends that are closed on top, the open and closed U-bends alternating in a checkerboard pattern, the strip being aligned generally transversely to the direction of flow of exhaust gas from the engine, the strip defining a tortuous flow path for exhaust gas from the engine, the strip being coated with a combustion catalyst,
 (b) pressure monitoring means for continuously sensing the pressure drop between the input and output ends of the parallel combination of the catalytic converters,
 (c) a pair of temperature regulating means for maintaining the temperature in the respective catalytic converters at a desired level,
 (d) diverter valve means for directing most of the exhaust gas from the engine into one or the other of the respective catalytic converters, and
 (e) control means for actuating either one of the temperature regulating means, the control means being connected to receive inputs from the pressure monitoring means and at least one moving part of the engine, the control means being adapted to actuate one of the temperature regulating means and the diverter valve means when the pressure drop, for a given engine speed, across one of the catalytic converters, exceeds a predetermined level, and to deactivate that temperature regulating means when the pressure drop, for a given engine speed, across the parallel combination of the catalytic converters, falls below another predetermined level.

15. The catalytic converter system of claim 14, wherein both temperature regulating means comprise means for sensing the temperature of the exhaust gas leaving one of the catalytic converters, and valve means operatively connected to the sensing means, wherein the valve means controls the flow of fuel into that catalytic converter.

16. The catalytic converter system of claim 15, wherein the control means is operatively connected to the cam shaft of the engine, whereby the control means receives inputs from the pressure monitoring means and the engine cam shaft.

17. The catalytic converter system of claim 16, wherein the control means is connected to a timer and valve actuator means, the timer and valve actuator means being operatively connected to the diverter valve means, the timer and valve actuator means being capable of holding the diverter valve means in a selected position for a desired period of time.

18. The catalytic converter system of claim 17, wherein the control means comprises a microprocessor, the microprocessor containing stored charts representing the maximum acceptable pressure drop for a given engine speed, and the pressure drop, for a given engine speed, below which the currently activated temperature regulating means should be deactivated.

19. The catalytic converter system of claim 18, wherein the cam shaft of the engine is connected to an analog-to-digital converter, and wherein the output of the analog-to-digital converter is connected to the input of the microprocessor.

20. The catalytic converter system of claim 19, wherein the diverter valve means comprises a butterfly valve, the butterfly valve having three positions, a neutral position allowing gas to flow freely into both catalytic converters, a second position forcing most of the gas to flow through only the first of the catalytic converters, and a third position forcing most of the gas to flow through only the second catalytic converter.

21. An automatic, self-regenerating catalytic converter system for a diesel engine, comprising:
  (a) a catalytic converter connected to receive exhaust gas from the diesel engine, the catalytic converter comprising a plurality of strips of metal, each strip being formed into an undulating series of U-bends, the series comprising U-bends that are open on top and U-bends that are closed on top, the open and closed U-bends alternating in a checkerboard pattern, the strips being aligned generally transversely to the direction of flow of exhaust gas from the engine, the strips defining a tortuous flow path for exhaust gas from the engine, the strips being coated with a combustion catalyst,
  (b) pressure monitoring means for continuously sensing the pressure drop between the input and output ends of the catalytic converter,
  (c) temperature regulating means for maintaining the temperature in the catalytic converter at a desired level, and
  (d) control means for actuating the temperature regulating means, the control means being connected to receive inputs from the pressure monitoring means and at least one moving part of the engine, the control means being adapted to actuate the temperature regulating means when the pressure drop, for a given engine speed, exceeds a predetermined level, and to deactivate the temperature regulating means when the pressure drop, for a given engine speed, falls below another predetermined level.

22. The catalytic converter system of claim 21, wherein the temperature regulating means comprises means for sensing the temperature of the exhaust gas leaving the catalytic converter, and valve means operatively connected to the sensing means, wherein the valve means controls the flow of fuel into the catalytic converter.

23. The catalytic converter system of claim 22, wherein the control means is operatively connected to the cam shaft of the engine, whereby the control means receives inputs from the pressure monitoring means and the engine cam shaft.

24. The catalytic converter system of claim 23, wherein the control means comprises a microprocessor, the microprocessor containing stored charts representing the maximum acceptable pressure drop for a given engine speed, and the pressure drop, for a given engine speed, below which the temperature regulating means should be deactivated.

25. The catalytic converter system of claim 24, wherein the cam shaft of the engine is connected to an analog-to-digital converter, and wherein the output of the analog-to-digital converter is connected to the input of the microprocessor.

26. An automatic, self-regenerating catalytic converter system for a diesel engine, comprising:
  (a) a pair of catalytic converters, the catalytic converters being connected in parallel to receive exhaust gas from the diesel engine, the catalytic converters both comprising a plurality of strips of metal, each strip being formed into an undulating series of U-bends, the series comprising U-bends that are open on top and U-bends that are closed on top, the open and closed U-bends alternating in a checkerboard pattern, the strips being aligned generally transversely to the direction of flow of exhaust gas from the engine, the strips defining a tortuous flow path for exhaust gas from the engine, the strips being coated with a combustion catalyst,
  (b) pressure monitoring means for continuously sensing the pressure drop between the input and output ends of the parallel combination of the catalytic converters,
  (c) a pair of temperature regulating means for maintaining the temperature in the respective catalytic converters at a desired level,
  (d) diverter valve means for directing most of the exhaust gas from the engine into one or the other of the respective catalytic converters, and
  (e) control means for actuating either one of the temperature regulating means, the control means being connected to receive inputs from the pressure monitoring means and at least one moving part of the engine, the control means being adapted to actuate one of the temperature regulating means and the diverter valve means, when the pressure drop, for a given engine speed, across one of the catalytic converters, exceeds a predetermined level, and to deactivate that temperature regulating means when the pressure drop, for a given engine speed, across the parallel combination of the catalytic converters, falls below another predetermined level.

27. The catalytic converter system of claim 26, wherein both temperature regulating means comprise means for sensing the temperature of the exhaust gas leaving one of the catalytic converters, and valve means operatively connected to the sensing means, wherein the valve means controls the flow of fuel into that catalytic converter.

28. The catalytic converter system of claim 27, wherein the control means is operatively connected to the cam shaft of the engine, whereby the control means receives inputs from the pressure monitoring means and the engine cam shaft.

29. The catalytic converter system of claim 28, wherein the control means is connected to a timer and valve actuator means, the timer and valve actuator means being operatively connected to the diverter valve means, the timer and valve actuator means being capable of holding the diverter valve means in a selected position for a desired period of time.

30. The catalytic converter system of claim 29, wherein the control means comprises a microprocessor, the microprocessor containing stored charts representing the maximum acceptable pressure drop for a given engine speed, and the pressure drop, for a given engine speed, below which the currently activated temperature regulating means should be deactivated.

31. The catalytic converter system of claim 30, wherein the cam shaft of the engine is connected to an analog-to-digital converter, and wherein the output of the analog-to-digital converter is connected to the input of the microprocessor.

32. The catalytic converter system of claim 31, wherein the diverter valve means comprises a butterfly valve, the butterfly valve having three positions, a neutral position allowing gas to flow freely into both catalytic converters, a second position forcing most of the gas to flow through only the first of the catalytic converters, and a third position forcing most of the gas to flow through only the second catalytic converter.

* * * * *